June 6, 1967  M. H. ROBERTS  3,324,392
MEANS FOR IMPARTING A TORQUE PROPORTIONAL TO FREQUENCY
TO A BIASED INDICATOR ROTOR
Filed Oct. 23, 1964
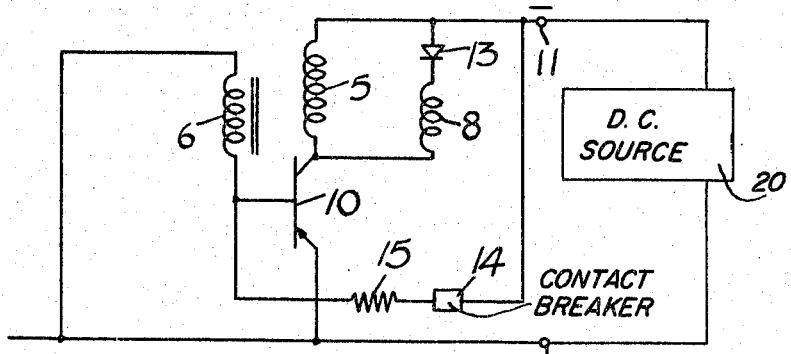
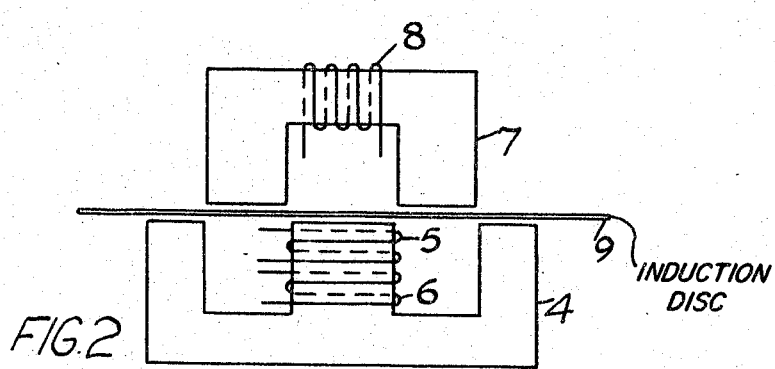
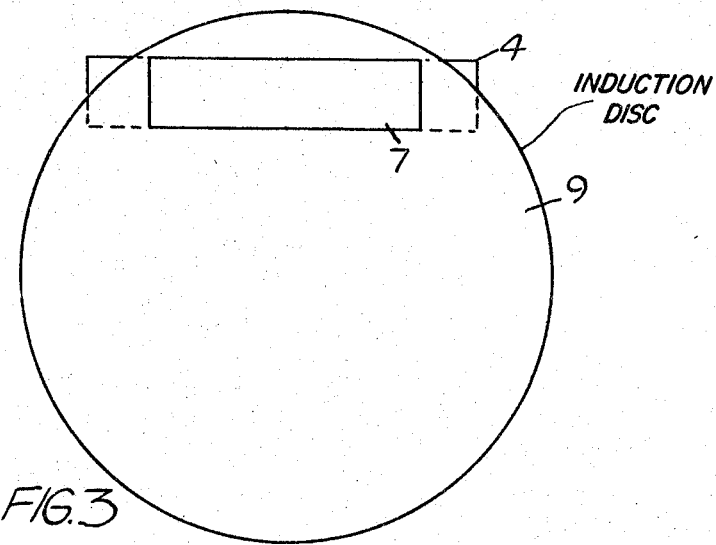

United States Patent Office 3,324,392
Patented June 6, 1967

3,324,392
MEANS FOR IMPARTING A TORQUE PROPORTIONAL TO FREQUENCY TO A BIASED INDICATOR ROTOR
Maldwyn Hugh Roberts, Little Sutton, Sutton Coldfield, England, assignor to Joseph Lucas (Industries) Limited, Birmingham, England
Filed Oct. 23, 1964, Ser. No. 405,949
1 Claim. (Cl. 324—78)

The object of this invention is to provide means for imparting torque proportional to frequency to a biased indicator rotor.

Means according to the invention comprise in combination a transistor, means for applying intermittent pulses of one polarity to the base terminal of the transistor, a first winding connected between the collector terminal of the transistor and a first terminal adapted for connection to a terminal of a source of D.C. having similar polarity to the aforesaid pulses, a second winding arranged to oppose the first winding and connected between the base terminal of the transistor and a second terminal adapted for connection to the terminal of the source of D.C. of opposite polarity, said second terminal being connected to the emitter terminal of the transistor, a common core on which said first and second windings are wound, a third winding and diode connection in series across the first winding, a second core on which the third winding is wound, said second core being spaced from said common core, and an angularly movable induction disc so arranged in relation to the cores that angular movement will be imparted thereto by the interaction of the flux produced by the second and third windings after the transistor has been "cut-off."

FIGURE 1 is a circuit diagram of the disclosed apparatus.

FIGURES 2 and 3 respectively are side and plan views illustrating the arrangement of the cores.

An example of the invention is illustrated in the accompanying drawings as applied to a speedometer, tachometer, or other instrument for measuring the angular velocity of a rotating part. Referring to the drawings there is provided an E-shaped laminated core 4 on the middle limb of which are wound first and second windings 5, 6 which are magnetically coupled. Presented to the gaps in this core are the pole tips of a second laminated core 7 of U-shape on which is a third winding 8, whilst between the two cores is mounted an angularly movable induction disc 9, which may be calibrated for reading against an index, or may carry a pointer movable over a calibrated scale. The disc is loaded in one angular direction by a light spiral spring (not shown) which will return the disc to a zero position corresponding to an equilibrium position of the spring when the instrument is inoperative.

The winding 5 is connected between the collector terminal of a p.n.p. type transistor 10 and a first terminal 11 adapted for connection to the negative terminal of a battery or other source of D.C. 20. The emitter terminal of the transistor 10 is connected to a second terminal 12 adapted for connection to the positive terminal of the source of D.C. The terminal 12 is also connected through the winding to the base terminal of the transistor 10, the latter terminal being connected in addition to means for supplying negative pulses to the base terminal at a frequency proportional to the angular velocity of the rotating part the angular velocity of which is to be measured. This means may as shown comprise a cam-operated contact breaker, or other like device 14 connected in series with a resistor 15 between the base terminal of the transistor and the terminal 11.

The winding 8 is connected in series with a diode 13 winding 5 and a protective resistor (not shown) may be connected in shunt with the winding 8.

Since the base terminal of the transistor 10 is connected to the terminal 12 through the winding 6 negligible current flows normally through the transistor. However, when the base terminal is negatively biased momentarily a pulse current flows through the transistor and the winding 5, thus inducing a voltage in the winding 6 to apply a negative voltage to the transistor base terminal and increase the current through the transistor. The current thus increases cumulatively until the winding 5 is saturated, whereafter since there is no change in flux to induce a voltage in the second winding the transistor is "cut-off." The back E.M.F. developed across the winding 5 after the transistor is "cut-off" causes a current to flow through the diode 13 and winding 8. Thus the flux in the winding 5 falls as the flux in the winding 8 rises. A magnetic circuit between the cores 4, 7 is completed through the disc 9, and so these changes in flux exert a torque on the induction disc 9 in a direction to move it against its spring. Moreover, since the frequency of these torque pulses will be proportional to the frequency of the pulses applied to the transistor base terminal which are in turn proportional to the angular velocity of the rotating part actuating the contact-breaker or the like, by suitable calibration the instrument can be used as a tachometer or speedometer.

If the negative pulses are applied to the base of the transistor through a rectifier from a source of A.C. the frequency of which is to be measured, then by suitable calibration, the instrument can serve as a frequency meter.

It will be understood that in all instances an npn type transistor could be used instead of a pnp type by changing the connections to the battery or other source of D.C., and by applying positive pulses to the base of the transistor.

Having thus described my invention what I claim as new and desire to secure by Letters Patent is:

Means for imparting torque proportional to frequency to a biased indicator rotor, comprising in combination first and second cores between which the rotor is mounted, said rotor completing a magnetic circuit between said cores, first and second magnetically coupled windings on said first core, a third winding on said second core, a transistor, means for applying pulses of one polarity to the base of said transistor to turn it on, said pulses being applied at a rate proportional to said frequency, a D.C. source having first and second terminals of said one polarity and the opposite polarity respectively, means connecting the base of said transistor to said second terminal through said second winding, whereby said transistor is biased to non-conduction between said pulses, means connecting the emitter of said transistor to said second terminal, means connecting the collector of said transistor to said first terminal through said first winding, and a diode connected in series with said third winding across said first winding, current flow through said first winding when a pulse is applied to the base of said transistor increasing cumulatively, as a result of the coupling between the first and second windings, until a condition of saturation is reached, whereupon said transistor is cut off and the resultant back E.M.F. generated across said first winding is conducted by the diode and third winding, the interaction between the flux produced by the first and third windings at this stage causing angular movement of said rotor.

(References on following page)

References Cited
UNITED STATES PATENTS

| | | | |
|---|---|---|---|
| 2,443,668 | 6/1948 | Tagg | 324—70 |
| 2,485,548 | 10/1949 | Abbott | 317—156 |
| 2,513,843 | 7/1950 | Carlin | 317—156 |
| 3,268,811 | 8/1966 | Jefferson | 324—70 |

OTHER REFERENCES

"Blocking Oscillator Tachometer Is Insensitive to Voltage Change," Electronic Design, Aug. 30, 1963, pp. 56 and 57.

WALTER L. CARLSON, *Primary Examiner.*

M. J. LYNCH, *Assistant Examiner.*